(12) United States Patent
Noui et al.

(10) Patent No.: US 11,953,696 B2
(45) Date of Patent: Apr. 9, 2024

(54) DISPLAY DEVICE

(71) Applicant: TriLite Technologies GmbH, Vienna (AT)

(72) Inventors: Louahab Noui, East Sussex (GB); Joerg Reitterer, Brunn am Gebirge (AT)

(73) Assignee: TriLite Technologies GmbH, Vienna (AT)

(*) Notice: Subject to any disclaimer, the term of this patent is extended or adjusted under 35 U.S.C. 154(b) by 0 days.

(21) Appl. No.: 18/119,372

(22) Filed: Mar. 9, 2023

(65) Prior Publication Data
US 2023/0288713 A1   Sep. 14, 2023

(30) Foreign Application Priority Data
Mar. 9, 2022   (EP) .................................... 22161030

(51) Int. Cl.
*G06F 3/01*   (2006.01)
*G02B 27/01*   (2006.01)

(52) U.S. Cl.
CPC ..... G02B 27/0179 (2013.01); G02B 27/0172 (2013.01); G06F 3/013 (2013.01); *G02B 2027/0178* (2013.01); *G02B 2027/0187* (2013.01)

(58) Field of Classification Search
CPC . G06F 3/013; G02B 27/0179; G02B 27/0172; G02B 2027/0178; G02B 2027/0187
See application file for complete search history.

(56) References Cited

U.S. PATENT DOCUMENTS

| | | | |
|---|---|---|---|
| 2012/0105310 A1* | 5/2012 | Sverdrup | G02B 27/0172 345/8 |
| 2020/0241308 A1* | 7/2020 | Danziger | G06V 40/19 |

FOREIGN PATENT DOCUMENTS

| | | |
|---|---|---|
| CN | 112558751 A | 3/2021 |
| WO | 2018122859 A1 | 7/2018 |

OTHER PUBLICATIONS

European Search Report corresponding to Application No. 22161030.6-1020, dated Aug. 8, 2022.

* cited by examiner

*Primary Examiner* — Robert J Michaud
(74) *Attorney, Agent, or Firm* — Hoffmann & Baron, LLP

(57) ABSTRACT

The present disclosed subject matter relates to a display device for displaying an image to an eye, comprising a support mounting a light source and a mirror assembly. The light source is configured to emit a visible light beam carrying the image towards the mirror assembly, and the mirror assembly is configured to angularly oscillate and deflect the emitted visible light beam towards the eye. A light sensor is mounted on the support and configured to record return light received via said mirror assembly from the eye. The display device further comprises a processor connected to the light sensor and configured to detect a state of the eye from the recorded return light.

16 Claims, 4 Drawing Sheets

DISPLAY DEVICE

CROSS-REFERENCE TO RELATED APPLICATIONS

This application claims priority to the European Patent Application No. 22 161 030.6 filed Mar. 9, 2022, the disclosure of which is incorporated herein by reference.

TECHNICAL FIELD

The present disclosed subject matter relates to a display device for displaying an image to an eye, comprising a support mounting a light source and a mirror assembly, wherein the light source is configured to emit a visible light beam carrying the image towards the mirror assembly and the mirror assembly is configured to angularly oscillate and deflect the emitted visible light beam towards the eye.

BACKGROUND

Display devices of this kind are commonly used in virtual reality (VR) or augmented reality (AR) glasses, helmets or head-up displays for a broad range of applications like navigation, training, entertainment, education or work. A light source emits a visible light beam of one or usually three (red, green, blue) colors carrying an image comprised of pixels onto a moving mirror assembly, e.g., a micro-electro-mechanical-system (MEMS) mirror, which deflects the visible light beam into subsequent directions (angles), one direction (angle) per pixel of the image. For example, the mirror assembly oscillates fast about a vertical axis and slowly about a horizontal axis to sweep the directions and, thus, scan the visible light beam over the pixels of a display area row by row and line by line.

In VR applications, the display area is typically a (miniature) reflective screen in front of the user's eye. In AR applications the display area is a semi-transparent combiner which redirects the visible light beam towards the user's eye while concurrently superposing it with a light field from a surrounding. In either case the cornea and the lens of the user's eye focus the visible light beam from a specific direction onto one image point on the retina so that all image points on the retina then form the image perceived by the user. In head mounted displays the mirror assembly may even project the scanned visible light beam directly into the user's eye, without any reflective screen or semi-transparent combiner.

In all of these displays detecting a state of the user's eye, e.g., whether the eye is open or closed, where the eye is looking at, what the eye is focused on, how the eye's lens is accommodated, how the eye moves, when a saccade occurs, etc., allows to increase the functionality of the display device and enables a manifold of applications. For a binocular embodiment, the eye tracker can be used to determine the interpupillary distance (IPD) of the user.

By way of example, upon a detection of a closed eye for a longer time span the display device may shut down to save electrical power. A detection of the looking direction of the eye may enable direction-selective control of the light source or of the mirror assembly, e.g., for increasing the resolution or refresh rate in the looking direction or for foveated rendering where the image is selectively rendered in a higher quality in the looking direction. Or, from a detection of biometric features of the eye the user may be identified; from a detected size of a pupil of the eye the image brightness may be adjusted; and from the detected vergence and/or focus of the user's eyes stereoscopic image quality may be increased and therewith the immersion in virtual or augmented reality improved.

For detecting the state of the user's eye it is known in the art to mount a separate eye tracker on the display device to illuminate the eye, record a picture of the illuminated eye and detect the state of the eye from the picture. Common eye trackers, thus, require additional installation space, induce additional weight and complicate the arrangement of optical elements of the display device. Moreover, in case the mirror assembly or the light source should be controlled or the image be processed in dependence on the looking direction, the focus or the vergence of the user's eyes, a cumbersome and often imprecise alignment of the eye tracker with the display device is necessary.

BRIEF SUMMARY

It is an object of the present disclosed subject matter to provide a display device capable of eye tracking which overcomes the problems of the state of the art.

This object is achieved with a display device for displaying an image to an eye, comprising:
- a support mounting a light source and a mirror assembly, wherein the light source is configured to emit a visible light beam carrying the image towards the mirror assembly, and the mirror assembly is configured to angularly oscillate and deflect the emitted visible light beam towards the eye;
- a light sensor mounted on the support and configured to record return light received via said mirror assembly from the eye; and
- a processor connected to the light sensor and configured to detect a state of the eye from the recorded return light.

The inventive display device uses one and the same mirror assembly both for displaying the image to the user's eye, via the visible light beam emitted by the light source, as well as for detecting the state of the eye, via the return light reflected by the user's eye and recorded by the light sensor. Since the mirror assembly of the display device is co-used for the detection of the state of the eye, the detection just needs one single additional element, namely the light sensor. Consequently, mounting an entire eye tracker on the display device is not required and substantial installation space and weight can be saved.

Moreover, as the visible light beam and the return light are guided via the same mirror assembly, their light paths are in a predetermined angular relation, i.e., already mutually aligned. A cumbersome alignment, as that of a conventional eye tracker with a conventional display, is not necessary any more. Due to the intrinsic alignment of the display part and the detection part of the device any vergence, focus and/or orientation of the user's eye/s detected can be directly utilised for controlling the image display, e.g., by controlling the light source, the mirror assembly or by adjusting pixels of the image to be displayed. For example, when the return light is recorded along the light path of the visible light beam, i.e., when the direction of recording and the direction of displaying coincide, the current state of the eye—as currently "seen" by the light source—can be detected and the light source controlled accordingly, "on the fly".

Summing up, a compact, lightweight, low-complexity display device is provided having the capability of detecting the state of the user's eye and efficiently utilising the same.

Optionally, a beam splitter is arranged between the light source and the mirror assembly to couple out the return light from the path of the visible light beam. Such a beam splitter separates the light path of the visible light beam running to the eye from the light path of the return light coming from the eye. Thus, the light sensor and the light source can be angularly separated on the support and interferences, e.g., by the light source shadowing the light sensor or by the return light entering the light source, can be avoided.

The light sensor may detect any return light from the eye, such as light emanating from the surrounding and reflected by the eye. However, the disclosed subject matter provides for two favourable embodiments with a dedicated illuminating light beam to cause the return light so that the intensity of the return light which is available for eye state detection can be actively chosen and adjusted.

In the first of these two embodiments the light sensor is configured to record, as said return light, a reflection of the visible light beam itself. Thereby, besides the mirror assembly, also the visible light beam emitted by the light source is used twice, once in forward direction for displaying the image to the eye and once—after having been reflected by the eye—in backward direction for detecting the state of the eye. Consequently, no additional dedicated light source for eye state detection is required. This results in a particularly compact and lightweight display device of low complexity.

In the second favourable embodiment, the display device comprises a further light source configured to emit an infrared light beam via said mirror assembly towards the eye and the light sensor is configured to record, as said return light, a reflection of the infrared light beam. In this embodiment, the light for displaying the image and the light for detecting the state of the eye are separated in wavelength and interferences are avoided. Hence, the intensity of the light for displaying, i.e., that of the visible light beam, and the intensity of the light for eye state detection, i.e., that of the infrared light beam, can be chosen independently of each other and, thus, be optimised for their respective purposes. Moreover, as the infrared light beam is not perceivable by the user, the eye state detection does not adversely affect the user's vision.

In a particularly favourable variant of this embodiment, a beam combiner is arranged between the light source and the further light source on the one hand and the mirror assembly on the other hand. Such a beam combiner guides the emitted visible light beam and the emitted infrared light beam onto a common light path such that they coaxially impinge on the mirror assembly. When the beam combiner is additionally chosen as a dichroic mirror, prism or filter, optical losses can be reduced and a leakage of the visible light beam into the light sensor be prevented.

The disclosed subject matter can be carried out with light sensors of different sizes of field of view. In a first, "small-field of view" embodiment of the disclosed subject matter, the light sensor is a photosensitive element configured to record an intensity of the return light in a predetermined direction from the photosensitive element as an intensity over time, and the processor is configured to determine a time corresponding to a minimum of the recorded intensity and to detect an orientation of the pupil from the determined time. In this embodiment, the light sensor "looks" in the predetermined direction and—via the oscillating mirror assembly—angularly scans the eye for return light. Hence, the eye is recorded in a "time division multiplex" fashion. The detected intensity of the return light at a point in time, thus, indicates a reflectivity of the eye in a specific "looking" direction of the light sensor at that point in time. Applicants have found that, when the light sensor looks straight into the pupil of the eye, the eye exhibits a minimal reflectivity and a minimal intensity will be recorded. This allows the processor to simply determine the orientation of the pupil from the looking direction at that time when the intensity minimum is detected, e.g., in an oscillation period of the mirror assembly or in a frame period of one image. Detecting a minimum in a signal is computationally simple such that processing power can be saved or a low-complex processor be used.

To this end, the processor is optionally configured to detect the orientation of the pupil from an angular position of the mirror assembly at the determined time. As the angular position of the mirror assembly in combination with said predetermined direction defines the instantaneous looking direction of the light sensor, the orientation of the pupil can be easily detected therefrom.

Alternatively, in a second, "large-field of view" embodiment of the disclosed subject matter, the light sensor is an array of photosensitive elements configured to record a picture of the return light, and the processor is configured to detect an orientation of the pupil by image processing the picture. Thereby, the light sensor looks—via the oscillating mirror assembly—at a multitude of points of the eye at once and the return light is recorded in a multitude of angles (in a "space division multiplex" fashion). The multitude of reflections recorded in the picture give a particularly precise information of the eye in and around the looking direction. Consequently, the processor can determine the orientation of the pupil particularly precisely.

In one variant of this embodiment, the array of photosensitive elements is configured to record at least two pictures at different angular positions of the mirror assembly, and the processor is configured to merge said at least two pictures into a stitched picture and detect the orientation of the pupil by image processing the stitched picture. Thereby, the eye is scanned in segments, picture after picture, each encoding a multitude of reflections in and around the respective looking direction, and the processor merges the segments to the stitched picture to more precisely and more efficiently determine the orientation of the pupil therein.

In some applications, e.g., virtual reality applications, the mirror assembly may be arranged close to the eye to directly display the visible light beam to the eye. In other applications, e.g., augmented reality applications, the display device may comprise an optical guide mounted on the support and configured to guide the deflected visible light beam towards the eye and the return light towards the mirror assembly so that the mirror assembly does not block the user's sight. This is particularly useful in combination with a transparent or at least semi-transparent optical guide which displays the image as an overlay "augmenting" the surrounding.

The optical guide can be any optical element to direct the visible light beam towards the eye and the return light beam back to the mirror assembly and the light sensor. The disclosed subject matter provides for three optional embodiments of the optical guide.

In a first embodiment the optical guide is a mirror, optionally a semi-reflective/semi-transparent mirror. Mirrors, also of arbitrary curvature ("freeform combiners"), reflect without dispersion so that the image can be displayed without any chromatic aberrations. Moreover, by shaping the mirror accordingly the object plane can be fitted to the user's needs, e.g., to achieve a focus at a regular working distance when augmenting a workplace surrounding.

In a second embodiment the optical guide is a holographic optical element. Holographic optical elements (HOEs) can encode the function of a—(semi)transparent for AR applications or opaque for VR applications—mirror in form of a hologram. HOEs can also be configured to reflect the visible light beam with a larger cross section, i.e., expanded, to increase the size of the so-called "eye box" of the display device. HOEs can also be fabricated on a flat substrate, yielding a thin and lightweight optical guide with a high transmittance to light emanating from the surrounding.

In a third embodiment, the optical guide is a waveguide with the capability to expand the guided light beam. Such a waveguide may be utilised for the visible light beam, for the return beam, and/or for the infrared light beam, e.g., according to one of the following variants or their combinations.

In one variant of the third embodiment the light source is configured to emit the visible light beam as a collimated visible light beam, the mirror assembly is configured to deflect the collimated visible light beam as a deflected collimated visible light beam, and the optical guide is a waveguide which has

- an in-coupling section configured to couple the deflected collimated visible light beam into the waveguide,
- a guiding section configured to guide the deflected collimated visible light beam through the waveguide, and
- an out-coupling section configured to couple the deflected collimated visible light beam out from the waveguide as a collimated expanded visible light beam whose cross section is larger than the cross section of the deflected collimated visible light beam.

In this variant the visible light beam is expanded and, thus, the so-called "eye box" ("exit pupil") of the display device is enlarged. Here, displaying the image is not affected by movements of the eye.

In another variant, which may be combined with the previously mentioned variant, the further light source is configured to emit the infrared light beam as a collimated infrared light beam, the mirror assembly is configured to deflect the collimated infrared light beam as a deflected collimated infrared light beam, and the optical guide is a waveguide which has

- an in-coupling section configured to couple the collimated infrared light beam into the waveguide,
- a guiding section configured to guide the deflected collimated infrared light beam through the waveguide, and
- an out-coupling section configured to couple the deflected collimated infrared light beam out from the waveguide as a collimated expanded infrared light beam whose cross section is larger than the cross section of the deflected collimated infrared light beam.

Similarly, in this variant the infrared light beam is expanded for illuminating the eye with an enlarged eye box.

In all three above-mentioned embodiments of the optical guide additional optics may be arranged upstream or downstream of the optical guide, e.g., an ocular optics for shifting an object plane and/or to compensate for unequal reflection over the optical guide.

Once the state of the eye is detected, the processor can control the display device in dependence thereon. In one optional embodiment the processor is connected to the light source and configured to control the light source in dependence on the detected state of the eye. Thereby, the processor may, for instance, completely turn-off the light source when a closed eye is detected to save power. Or the processor may adjust the image to be displayed, e.g., to obtain a high pixel density in a looking direction of the user, to calibrate the light source for color uniformity of the image irrespective of looking direction, etc.

In another optional embodiment the processor is connected to the mirror assembly and configured to control the mirror assembly in dependence of the detected state of the eye. Thereby, the processor may, for instance, modulate an excitation of the mirror assembly in frequency and/or amplitude to obtain a higher resolution or refresh rate in or around the looking direction of the user, to compensate the image for image distortion irrespective of pupil position, etc.

In this way, e.g., different sets of calibration data in dependence of the detected state of the eye can be used to optimize image performance.

BRIEF DESCRIPTION OF THE DRAWINGS

The disclosed subject matter will now be described by means of exemplary embodiments thereof with reference to the enclosed drawings, in which show.

DETAILED DESCRIPTION

Figure 1:
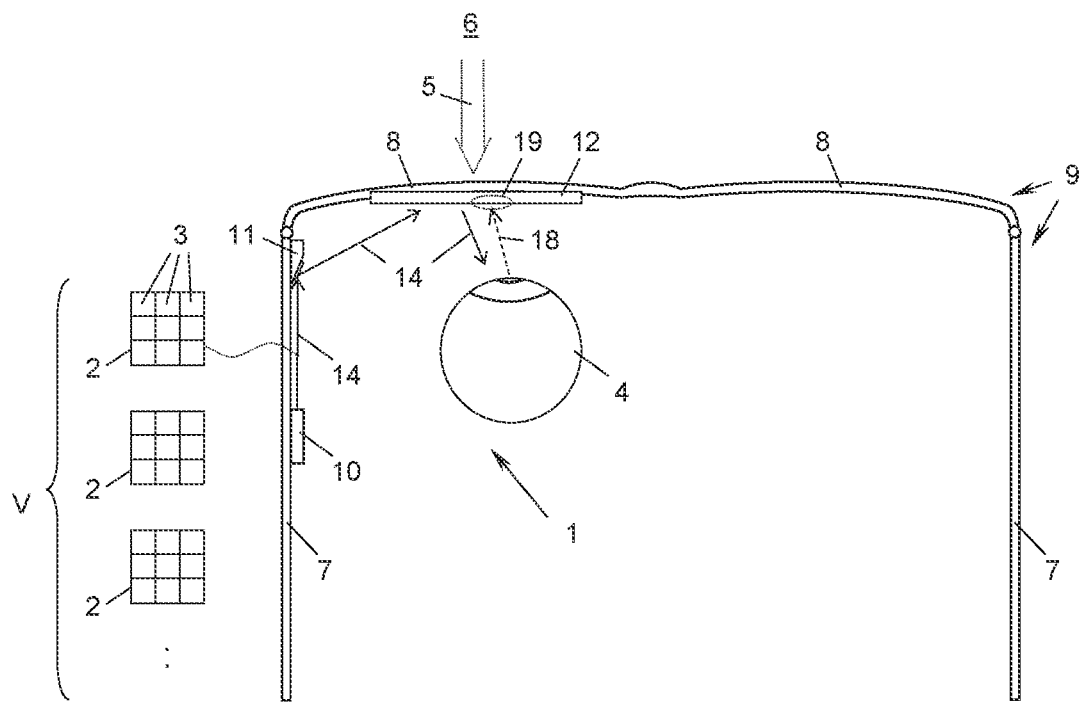
FIG. 1 an embodiment of a display device according to the disclosed subject matter as AR glasses in a schematic top view.

FIG. 1 shows a display device 1 for displaying an image 2 comprised of pixels 3 to a user's eye 4. The image 2 can, e.g., be monochromatic or colored, a single image or part of a video sequence V of images 2 and can be displayed either exclusively to the user's eye 4 in a virtual reality ("VR") application, or in addition to a light field 5 of a surrounding 6, e.g., in an augmented reality ("AR") application or in a conventional display application of the display device 1. The display device 1 can, thus, be any AR or VR display like a head-up display in a vehicle, a helmet or glasses worn by a user, a handheld device just like a smartphone, a static display device etc. and employed for a broad range of applications like navigation, training, entertainment, education or work.

In the exemplary embodiment shown in FIG. 1 the display device 1 is formed by a pair of AR glasses comprised of a spectacle frame with a pair of temples 7 and a pair of eye glasses 8. The spectacle frame forms a support 9 of the display device 1, onto or into which a light source 10, a mirror assembly 11 and an optical guide 12 are mounted.

Figure 2:
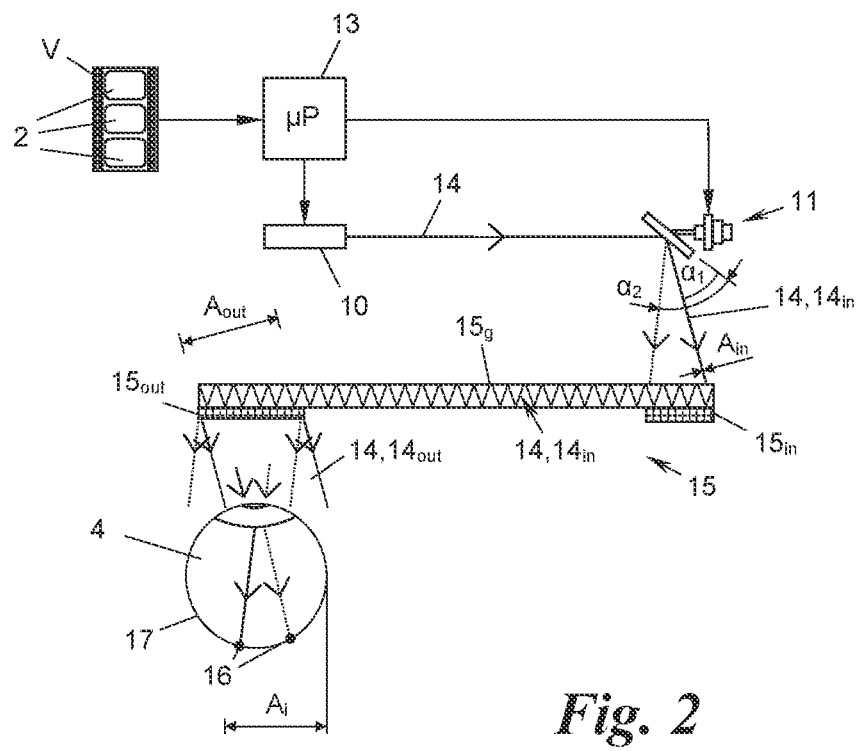
FIG. 2 the display device of FIG. 1 in more detail displaying an image to a user's eye via a visible light in an enlarged schematic top view.

The displaying of the image 2 to the eye 4 shall now be described with reference to FIGS. 1 and 2. As shown therein, the display device 1 comprises a processor 13 which stores the image 2 or the sequence V of images 2 and controls the light source 10 to emit, in dependence on the pixels 3 to be displayed, a (here: collimated; alternatively: uncollimated) pulsed or continuous visible light beam 14. The light beam 14 carries the image 2 in a time-multiplexed manner, i.e. the intensity values of the pixels 3 one after the other, e.g., row-by-row and line-by-line per image 2 comprised of a grid of pixels 3, and image-by-image per video comprised of a sequence V of images 2. For this purpose the light source 10 can be of any type known in the art capable to emit a visible light beam 14, i.e. a light beam comprising at least one wavelength visible to the user's eye 4. In most embodiments, the light source 10 is a semiconductor light source such as a light emitting diode (LED), microLED (μLED), or laser diode, e.g., edge-emitting laser diode or surface-emitting laser diode. For color pixels 3, the light source 10 may be a polychromatic light source 10, e.g., a set of laser diodes of three primary color which emit a visible light beam 14 comprised of three different wavelengths for color perception.

Downstream of the light source 10 the mirror assembly 11 angularly oscillates and deflects the emitted visible light beam 14 into subsequent directions (angles) a, one direction $\alpha$ per pixel 3 of the image 2 via the optical guide 12 towards the user's eye 4. FIG. 2 shows the light beam 14 deflected at two different angular positions of the mirror assembly 11, once as a solid line at a first angular position of the mirror assembly 11 for a first direction $\alpha_1$ and a second time as a dotted line at a second angular position of the mirror assembly 11 for a second direction $\alpha_2$. The mirror assembly 11 can, e.g., oscillate fast about a vertical axis and slowly about a horizontal axis to sweep the directions $\alpha$ and, thus, reproduce the pixels 3 of an image 2 row-by-row and line-by-line, and image-by-image for a sequence V of images 2. Alternatively, the mirror assembly 11 can sweep ("scan") the directions $\alpha$ by any other movement, e.g., by means of Lissajous curves, to reproduce the image/s 2.

The mirror assembly 11 can comprise, e.g., a single micro-electromechanical-system (MEMS) mirror oscillating about two perpendicular axes, or two MEMS mirrors arranged one after the other each oscillating about a respective one of two perpendicular axes.

In the embodiments shown, the mirror assembly 11 deflects the visible light beam 14 towards the optical guide 12. The optical guide 12 then guides the visible light beam 14 towards the user's eye 4 and optionally adjusts the vergence or beam diameter of the visible light beam 14. The optical guide 12 can be any optical element guiding the visible light beam 14, e.g., a mirror such as a semi-reflective/semi-transparent mirror (sometimes known in the art as "freeform combiner"), a holographic optical element (HOE), etc. For instance, in AR applications the optical guide 12 can be a semi-transparent combiner to superpose the image 2 to the light field 5 of the surrounding 6, whereas in VR applications the optical guide 12 can be opaque for the light field 5 of the surrounding 6 to exclusively display the image 2 to the user's eye 4.

In the embodiments shown in FIGS. 1, 2, 3, 6 and 9 the optical guide 12 is a waveguide 15 which expands the collimated visible light beam 14 in diameter and thereby the "exit pupil" or so-called "eye box" of the display device 1, wherefore the waveguide 15 is an "exit pupil expansion" (EPE) waveguide.

When using the EPE waveguide 15 as optical element 12, the light source 10 typically emits the visible light beam 14 collimated and the mirror assembly 11 deflects the collimated visible light beam 14 as a "deflected" collimated visible light beam $14_{in}$ towards the waveguide 15 for beam expansion and displaying. The EPE waveguide 15 has an in-coupling section $15_{in}$ for coupling the deflected collimated visible light beam $14_{in}$ into the waveguide 15, a guiding section $15_g$ for guiding the deflected collimated visible light beam $14_{in}$ through the waveguide 15, and an out-coupling section $15_{out}$ for coupling the deflected collimated visible light beam $14_{out}$ out from the waveguide as a collimated expanded visible light beam $14_{out}$ whose cross section $A_{out}$ is larger than the cross section $A_{in}$ of the deflected collimated visible light beam $14_{in}$ coupled in.

For coupling-in and coupling-out the visible light beam 14 ($14_{in}$ or $14_{out}$), the in-coupling and the out-coupling sections $15_{in}$, $15_{out}$ may comprise a reflective or transmissive diffraction grating or a reflective mirror on or inside the waveguide 15. The sizes of these sections $15_{in}$, $15_{out}$ determine the range of angles (directions) $\alpha$ which can be coupled in and the expansion of the visible light beam 14, respectively. For example, the cross sections $A_{in}$ and $A_{out}$ of the deflected and expanded visible light beams $14_{in}$, $14_{out}$ can be 0.5-25 mm$^2$ and 8-250 mm$^2$, respectively, such that the eye 4 is illuminated in an extended illumination area $A_i$.

In alternative embodiments (not shown) the display device 1 does not comprise the optical guide 12 and the mirror assembly 11 directly deflects the visible light beam 14 to the user's eye 4, i.e. without a further guidance by the optical guide 12.

Finally, the visible light beam 14 impinges on the user's eye 4. The user's eye 4 is an optical system per se whose cornea and lens focus the visible light beam 14 onto one image point 16 on the retina 17 per direction $\alpha$. In case of a perfectly collimated (parallel) visible light beam 14 per direction $\alpha$ the eye 4 will let the image 2 appear in an object plane at infinity. In order to shift the image 2 to a different object plane, i.e. to appear at a viewing distance of, e.g., 40-60 cm from the eye 4, the display device 1 can comprise an optical guide 12 with an optical power or additional optics as known in the art, e.g., optional push and pull lenses down- or upstream of the optical guide 12. Any such optics which may also affect the passing light field 5 of the surrounding 6 can optionally be compensated by respective optics in the light path of the light field 5, to accurately view the surrounding 6 in case of AR applications.

Up to now, the displaying of the image 2 in a "forward" direction of the display device 1 has been described. The display device 1, however, also has the further capability to detect, in a "backward", "reverse" or "return" direction of the display device 1, a state of the user's eye 4 such as whether the eye 4 is open or closed, where the eye 4 is looking at, where the eye 4 is focused on, how the lens of the eye 4 is accommodated, how the eye 4 moves, etc. As an example, FIG. 1 shows a looking direction 18 of the eye 4 onto a region of interest (ROI) 19, which looking direction 18 and/or ROI 19 can be detected by the display device 1 as described in the following.

As can be seen in FIGS. 3, 6, 9 and 10, for the purpose of eye state detection the display device 1 has a light sensor 20 mounted on the support 9 (not shown in these Figures). The light sensor 20 receives return light 21, which propagates in the return direction, via the mirror assembly 11 (and the optical guide 12, if present), records the return light 21 and encodes the recorded return light 21 in electric signals for the processor 13 connected to the light sensor 20. From the recorded return light 21 the processor 13 then detects the state of the eye 4 and subsequently controls the light source 10 and/or the mirror assembly 11 in dependence on the detected state of the eye 4. For instance, the processor 13 may control an oscillation frequency and/or amplitude of the mirror assembly 11 to scan a region of interest for a longer time or more often and the light source 12 accordingly, to display the image 2 with a higher resolution or refresh rate in the region of interest 19. Furthermore, by controlling the light source 10 and/or the mirror assembly 11 in dependence of the detected state of the eye 4, the controller 13 may adjust the display device calibration, e.g., to improve color uniformity, image distortion, and/or color co-registration. The processor 13 may even enhance the optical performance of the optical guide 12 by enhancing color uniformity and eliminate distortions. If desired, the processor 13 can adjust the image 2 or the series V of images 2, e.g., for foveated rendering when the processor 13 renders the images 2 to be displayed.

Figure 3:
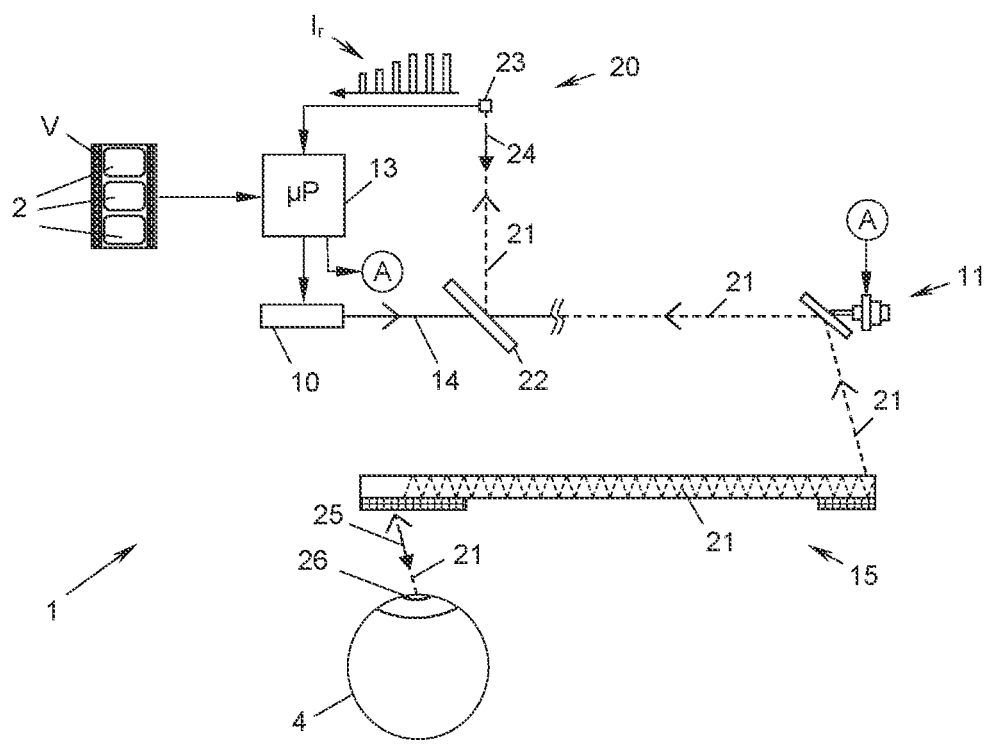
FIG. 3 an embodiment of the display device of FIGS. 1 and 2 detecting a state of the user's eye via return light received from the eye in a photosensitive element in an enlarged schematic top view.

To spatially separate the visible light beam 14 and the return light 21, in some embodiments a beam splitter 22 is arranged between the light source 10 and the mirror assembly 11. As shown in FIG. 3, the so arranged beam splitter 22 may couple out the return light 21 from the path of the visible light beam 14. The beam splitter 22 can be any beam splitter, for instance, a polarised beam splitter (optionally in combination with a waveplate retarder) when the light source 10 emits a polarised light beam such that no emitted light is wasted, a filtering beam splitter to let pass only specific wavelengths of the return light 21, etc.

Two alternative embodiments of the light sensor 20 shall now be described with reference to FIGS. 3-5 on the one hand and FIGS. 6-8 on the other hand. In these Figures, the return light 21 is a reflection of the visible light beam 14 from the eye 4 and recorded by the light sensor 21, albeit these light sensor embodiments are not limited to recording reflections of the visible light beam 14, as will be described later on.

Figure 4:
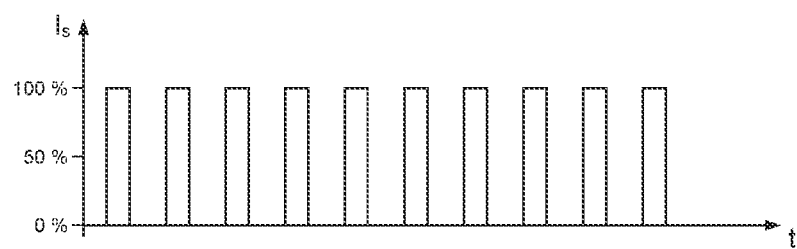
FIG. 4 an intensity of the visible light beam emitted by the light source of the display device of FIG. 3 in a diagram of intensity over time.
Figure 5:
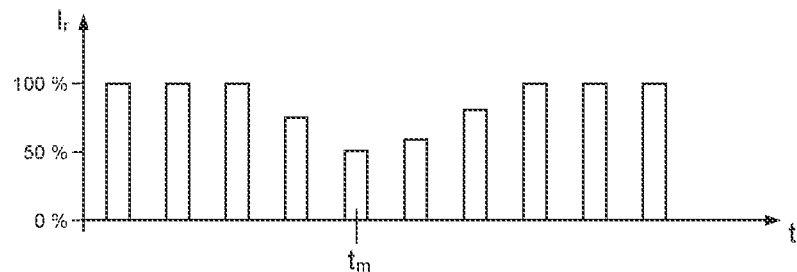
FIG. 5 an intensity of the return light recorded by the photosensitive element of FIG. 3 in a diagram of intensity over time.

In the embodiment shown in FIGS. 3-5, the light sensor 20 is a photosensitive element 23 which records an intensity of the return light 21 in a predetermined direction 24 from the photosensitive element 23 as an intensity $I_r$ over time (FIG. 5). The photosensitive element 23 "looks" at one instance in time—i.e. depending on the current angular position of the mirror assembly 11 and, hence, direction α of the visible light beam 14—substantially in one direction 25 at the eye 4, e.g., only in a small angular field of view of less than 3°, for instance less than 0.1°, or even less than 0.01° around the direction α. Consequently, with the oscillation of the mirror assembly 11 over time, the looking direction 25 of photosensitive element 23 scans the user's eye 4 in a time-multiplexed fashion.

The photosensitive element 23 may be any element employing the internal or external photo electric effect such as a photoelectric element, e.g. a semiconductor element like a photodiode, phototransistor, a photoresistor, a photochemical element, etc. Moreover, the photosensitive element 23 may be sensitive to a broad range of wavelengths or only to a selected small range of wavelengths, if desired.

The principle of scanning the looking direction 25 of the photosensitive element 23 over of the eye 4 is in this embodiment based on applicant's insight that, when the visible light beam 14 passes straight through the pupil 26 of the eye 4, the eye 4 reflects the smallest fraction of the visible light beam 14. Hence, from recording the reflected intensity $I_r$ over time, the processor 13 can determine the time $t_m$ (FIG. 5) that corresponds to a minimum of the recorded intensity $I_r$ within, e.g., one oscillation period of the mirror assembly 11 or the display period of an image 2.

In a first exemplary variant shown in FIGS. 4 and 5, the processor 13 causes the light source 10 to emit the visible light beam 14 in pulses with a constant emission intensity $I_s$, e.g., to display a dedicated homogeneous image 2 for a short time span which may be a fraction of a second only, e.g., one oscillation or display period. Then, the processor 13 determines the time $t_m$ as that time at which the absolute minimum of the recorded intensity $I_r$ over the time span occurred.

In a second exemplary variant, the processor 13 may cause the light source 10 to display an inhomogeneous image 2, i.e. at a non-constant emission intensity $I_s$ (not shown), and normalise the recorded intensity $I_r$ by the emission intensity $I_s$ to determine the time $t_m$ from a normalised recorded intensity.

In a third exemplary variant, the processor 13 may determine the time $t_m$ as the time at that the recorded intensity $I_r$ (absolute or normalised by the emission intensity $I_s$) falls below a predetermined threshold. Thus, the term "minimum of the recorded intensity $I_r$" may refer to global or local minima alike.

Having determined the time tm, the processor 13 can detect the orientation of the pupil 26 of the eye 4 (and therewith the looking direction 18 of the eye 4 and the region of interest 19) therefrom. This can in principle be done in many ways. In the exemplary embodiment shown in FIG. 3, the photosensitive element 23 "looks" coaxially to the visible light beam 14 such that the recorded return light 21 and the visible light beam 14 are coaxial. Thus, the processor 13 can detect the orientation of the pupil 26 as coaxial to the looking direction 25 of the photosensitive element 23 at the determined time $t_m$. It shall, however, be noted that in alternative embodiments an angular offset between the return light 21 and the visible light beam 14 may be employed and considered in the processor 13 when determining the time $t_m$ and detecting the orientation of the pupil 26.

In general, the processor 13 can indicate the detected orientation of the pupil 26 in different ways, e.g., in terms of an angular position of the mirror assembly 11 at the time $t_m$, in terms of the time $t_m$ with reference to one oscillation or display period, or in terms of that pixel 3 of the image 2 that is displayed at the determined time $t_m$.

It goes without saying that the processor 13 may detect the orientation of the pupil 26 not only once, as described above, but every oscillation or display period.

Figure 6:
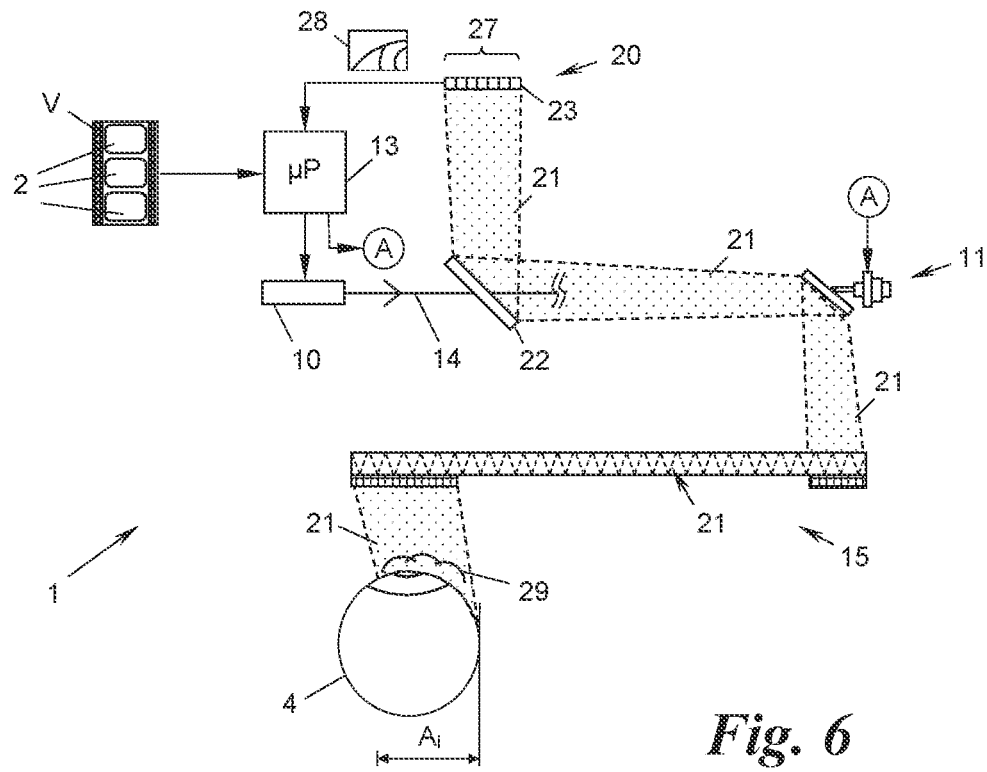
FIG. 6 an embodiment of the display device of FIGS. 1 and 2 detecting a state of the user's eye via return light received from the eye in an array of photosensitive elements in an enlarged schematic top view.
Figure 7:
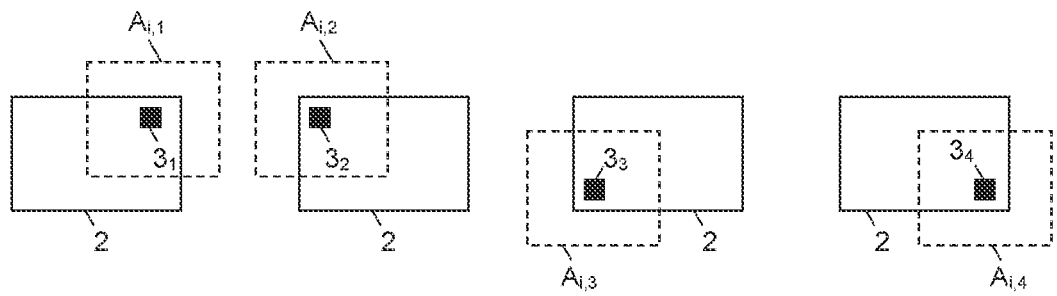
FIG. 7 four pixels of the image displayed by the display device of FIG. 6 at four different display times.
Figure 8:
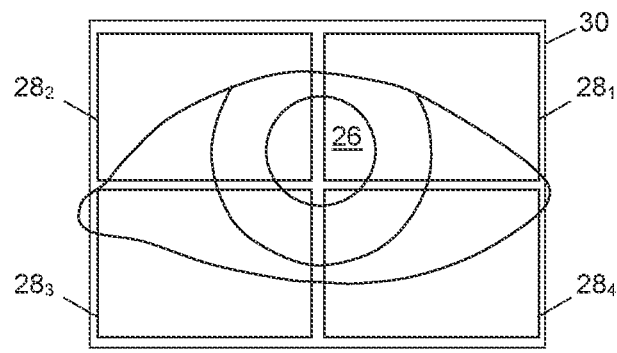
FIG. 8 four corresponding pictures of the user's eye recorded by the photosensitive elements of the display device of FIG. 6.

In the embodiment shown in FIGS. 6-8, the light sensor 20 is a two-dimensional array 27 of photosensitive elements 23 which records a two-dimensional picture 28 (FIG. 6) of the return light 21. The array 27 "looks"—like a camera—at a multitude of reflection angles at once, for example over a field of view of 30° or less. Consequently, also a diffuse reflection of the visible light beam 14 from the eye 4 (schematically depicted in FIG. 6 by spherical waves 29 emanating from the eye 4) in a multitude of angles is recorded as return light 21 (depicted by the light-dotted area in FIG. 6) and will be recorded by the array 27. As can be seen in FIG. 6, the size of the recorded picture 28 can be adjusted by the size of the optical elements used (the mirror assembly 11, the coupling sections $15_{in}$, $15_{out}$, the beam splitter 22, the array 27, etc.) and their mutual distances.

The recorded picture 28 is transferred from the array 27 to the processor 13 which detects the orientation of the pupil 26 by image processing the picture 28, e.g., by means of object or feature detection known in the art, optionally accompanied by image correction, e.g., distortion correction and/or alignment with respect to the visible light beam 14.

Depending on the illumination area $A_i$ of the visible light beam 14 (FIGS. 2 and 6), a smaller or larger part of the eye 4 (or even the whole eye) may be recorded at a single time. FIGS. 7 and 8 depict a variant in which at least two (here: four) temporally consecutive pixels $3_1, 3_2, 3_3, 3_4$ (FIG. 7) of the image 2 are displayed to the eye 4 each corresponding to a different illumination area $A_{i,1}$–$A_{i,4}$ in order to record—at respective different angular positions of the mirror assembly 11 and, hence, directions α—respective pictures 281, 282, 283, 284, see FIG. 8. The processor 13 merges the recorded pictures $28_1$-$28_4$ into a stitched picture 30 employing an image stitching algorithm and detects the orientation of the pupil 26 by image processing the stitched image 30.

As indicated above, the return light 21 is not limited to be a reflection of the visible light beam 14 from the eye 4. The return light 21 may alternatively or additionally be a reflection from the light field 5 of the surrounding 6, and/or a reflection of a dedicated light beam as described in the following with reference to FIGS. 9 and 10.

Figure 9:
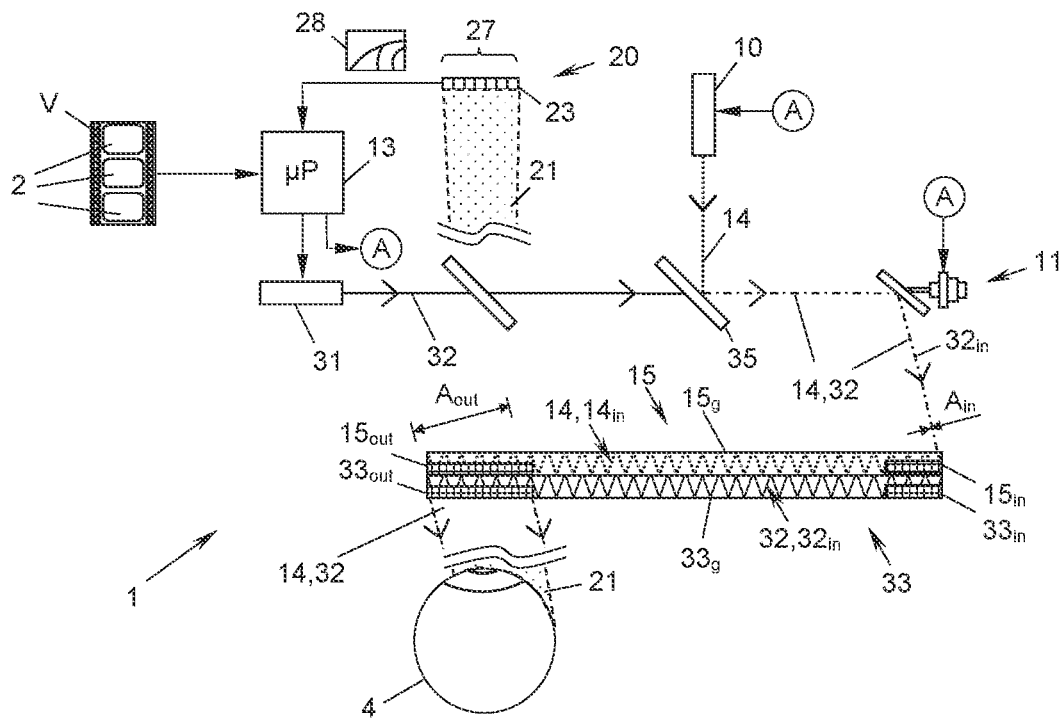
FIGS. 9 and 10 further embodiments of the display device of the disclosed subject matter detecting the state of the user's eye by means of an infrared light beam guided towards the user's eye via an optical waveguide (FIG. 9) and via a mirror (FIG. 10), respectively, each in an enlarged schematic top view.
Figure 10:
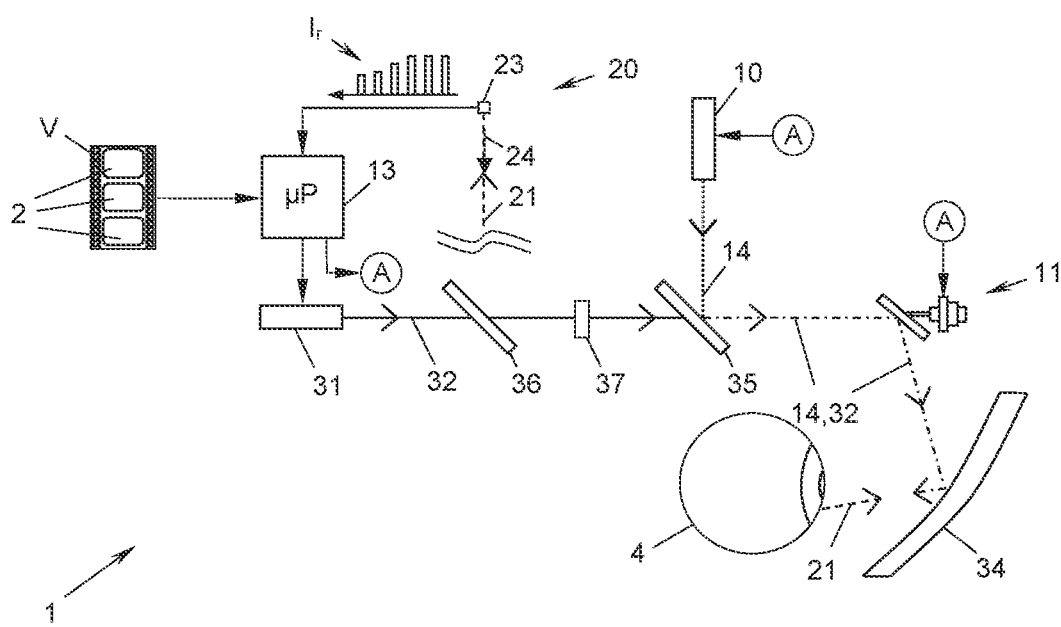

In the embodiments of FIGS. 9 and 10, the display device 1 comprises a further light source 31 which emits a (collimated or uncollimated) infrared light beam 32 via the mirror assembly 11 (and the optical guide 12, if present) towards the eye 4, where it is reflected as the return light 21 and recorded by the light sensor 20.

Any light sensor 20, e.g., the photosensitive element 23 of FIG. 10 or the array 27 of photosensitive elements 23 of FIG. 9, may be employed to record the infrared light beam 32 deflected by the eye 4 as return light 21. In the embodiment of FIGS. 3-5, each of the three variants of detecting the time $t_m$ corresponding to the minimum of the recorded intensity $I_r$ (here: of the infrared light beam 32 reflected as return light 21) is possible as well. In particular, the first variant with constant emission intensity $I_s$ (here: of the infrared light beam 32) can be employed without affecting the image 2 to be displayed. In the embodiment of FIGS. 6-8, each pixel 31, 32, 33, 34 may define a respective infrared illumination area $A_{i,1}$-$A_{i,4}$ which may coincide (or not) with the respective illumination area $A_i$ of the visible light beam 14 for displaying the image 2.

In general, different embodiments of the optical guide 12 (if present) are possible to guide the visible and the infrared light beams 14, 32 either separately by a dedicated element each, or together by a common optical element, e.g., a common waveguide, a common mirror or "freeform combiner", a common holographic optical element (HOE), as explained in the following.

In the embodiment of FIG. 9, a first EPE waveguide 15 is arranged for the visible light beam 14 and a second EPE waveguide 33 is arranged for the infrared light beam 32 and its reflection, the return light 21. To expand the infrared light beam 32, the further light source 31 emits the infrared light beam 32 collimated, the mirror assembly 11 deflects the collimated infrared light beam 32 as a "deflected" collimated infrared light beam $32_{in}$, and the second EPE waveguide 33 may have an analogue structure as the first EPE waveguide 15, namely, an in-coupling section $33_{in}$ for coupling in the deflected collimated infrared light beam $32_{in}$, a guiding section $33_g$ for guiding the deflected collimated infrared light beam $32_{in}$, and an out-coupling section $33_{out}$ for coupling the deflected collimated infrared light beam $32_{in}$ out from the second waveguide 32 as a collimated expanded infrared light beam $32_{out}$ whose cross section $A_{out}$ is larger than the cross section $A_{in}$ of the deflected collimated infrared light beam $32_{in}$.

In different variants of this embodiment, the in-coupling and out-coupling sections $15_{in}$, $33_{in}$, $15_{out}$, $33_{out}$ of the first and second waveguides 15, 33 guide the visible and infrared light beams 14, 32 either in the same directions, such that the infrared and visible light beams 14, 32 are coaxial, or in different directions such that the infrared and visible light beams 14, 32 are guided towards the eye 4 at different angles. For example, the eye 4 may be recorded with the infrared light beam 32 in a larger area than the area of the eye 4 that is used for displaying the image 2 with the visible light beam 14.

In the embodiment of FIG. 10, as optical guide 12 a common mirror 34 for both the visible and the infrared light beam 14, 32 is used. The mirror 34 deflects the (here: coaxial; alternatively: non-coaxial) infrared and visible light beams 14, 32 in forward direction towards the eye 4 and the return light 21 in reverse direction towards the light sensor 20.

When a HOE is used as optical guide 12, a separate hologram (in the same holographic film) can be recorded for each primary color (red, green, blue) of the visible light beam 14 and for the infrared light beam 32.

As shown in FIGS. 9 and 10, a combiner 35 may be arranged between the light sources 10, 31 on the one hand and the mirror assembly 11 on the other hand, to combine the visible and infrared light beams 14, 32 into a common light path. Alternatively, the light paths of the visible and infrared light beams 14, 32 may be separated.

FIG. 10 exemplifies the use of a combination of a polarised beam splitter 36 with a waveplate 37, e.g., a quarter waveplate. Here, the further light source 31 emits a polarised infrared light beam 32 which traverses the polarised beam splitter 34 and then the quarter waveplate 37 in forward direction and—after having been reflected by the eye 4 as the return light 21—traverses the quarter waveplate 37 again in reverse direction in order to be then fully deflected by the polarising beam splitter 35 towards the light sensor 20. Of course, this combination may be used for only the visible light source 10 analogously.

It goes without saying that embodiments with a different number of light sources 10 and 31, embodiments with different light sensors 21, be it a photosensitive element 23 or an array 27 of photosensitive elements 23, and embodiments with different optical guides 12 or no optical guide 12 at all or with or without waveplates 37 may employed in any combination.

For stereoscopic perception and eye state detection a display device 1 as described herein can be used for each one of a pair of user's eyes 4, e.g., to also detect a vergence of the eyes 4 or to determine the interpupillary distance (IPD) of the user. In such a stereoscopic display system with two display devices 1 the display devices 1 may share at least one of their components such as support 9, light source 10, further light source 31, mirror assembly 11, optical guide 12.

While only some relative positionings of the light sources 10, 31, the mirror assembly 11, and the optical guide 12 have been exemplarily shown in the drawings, any different arrangement is possible as well. For example, the first and/or second waveguides 14, 32 could guide the respective light beam 14, 32—instead of the "Z-shaped" path depicted—in a "U-shaped" path towards the eye 4.

Furthermore, while the components necessary for eye state detection have been described, further optical elements may be present in the display device 1 such as lenses or mirrors for guiding and focusing any of the visible light beam 14, the infrared light beam 32, and the return light 21.

The present disclosed subject matter is not restricted to the specific embodiments and variants described in detail herein but encompasses all those embodiments, variants, combinations and modifications thereof that fall within the scope of the appended claims.

What is claimed is:

1. A display device for displaying an image to an eye, comprising:
a support mounting a light source and a mirror assembly consisting of a single micro-electromechanical-system, MEMS, mirror oscillating about two perpendicular axes or two MEMS mirrors arranged one after the other each oscillating about a respective one of two perpendicular axes, wherein the light source is configured to emit a visible light beam carrying the image towards the mirror assembly, and the mirror assembly is configured to angularly oscillate and deflect the emitted visible light beam towards the eye;
a light sensor mounted on the support and configured to record return light received via said mirror assembly from the eye; and
a processor connected to the light sensor and configured to detect a state of the eye from the recorded return light,
wherein the processor is connected to the mirror assembly and configured to control the mirror assembly in dependence of the detected state of the eye.

2. The display device according to claim 1, comprising a beam splitter arranged between the light source and the mirror assembly to couple out the return light from the path of the visible light beam.

3. The display device according to claim 1, wherein the light sensor is configured to record, as said return light, a reflection of the visible light beam.

4. The display device according to claim 1, comprising a further light source configured to emit an infrared light beam via said mirror assembly towards the eye, wherein the light sensor is configured to record, as said return light, a reflection of the infrared light beam.

5. The display device according to claim 4, comprising a beam combiner arranged between the light source and the further light source on the one hand and the mirror assembly on the other hand.

6. The display device according to claim 1, wherein the light sensor is a photosensitive element configured to record an intensity of the return light in a predetermined direction from the photosensitive element as an intensity over time,
wherein the processor is configured to determine a time corresponding to a minimum of the recorded intensity and to detect an orientation of the pupil from the determined time.

7. The display device according to claim 6, wherein the processor is configured to detect the orientation of the pupil from an angular position of the mirror assembly at the determined time.

8. The display device according to claim 1, wherein the light sensor is an array of photosensitive elements configured to record a picture of the return light,
wherein the processor is configured to detect an orientation of the pupil by image processing the picture.

9. The display device according to claim 8, wherein the array of photosensitive elements is configured to record at least two pictures at different angular positions of the mirror assembly,
wherein the processor is configured to merge said at least two pictures into a stitched picture and detect the orientation of the pupil by image processing the stitched picture.

10. The display device according to claim 1, comprising an optical guide mounted on the support and configured to guide the deflected visible light beam towards the eye and the return light towards the mirror assembly.

11. The display device according to claim 10, wherein the optical guide is a mirror.

12. The display device according to claim 10, wherein the optical guide is a holographic optical element.

13. The display device according to claim 10, wherein the light source is configured to emit the visible light beam as a collimated visible light beam;
wherein the mirror assembly is configured to deflect the collimated visible light beam as a deflected collimated visible light beam; and
wherein the optical guide is a waveguide which has
an in-coupling section configured to couple the deflected collimated visible light beam into the waveguide,
a guiding section configured to guide the deflected collimated visible light beam through the waveguide, and
an out-coupling section configured to couple the deflected collimated visible light beam out from the waveguide as a collimated expanded visible light beam whose cross section is larger than the cross section of the deflected collimated visible light beam.

14. The display device according to claim 10,
comprising a further light source configured to emit an infrared light beam via said mirror assembly towards the eye;
wherein the light sensor is configured to record, as said return light, a reflection of the infrared light beam;
wherein the further light source is configured to emit the infrared light beam as a collimated infrared light beam;
wherein the mirror assembly is configured to deflect the collimated infrared light beam as a deflected collimated infrared light beam; and
wherein the optical guide is a waveguide which has
an in-coupling section configured to couple the deflected collimated infrared light beam into the waveguide,
a guiding section configured to guide the deflected collimated infrared light beam through the waveguide, and
an out-coupling section configured to couple the deflected collimated infrared light beam out from the waveguide as a collimated expanded infrared light beam whose cross section is larger than the cross section of the deflected collimated infrared light beam.

15. The display device according to claim 13,
comprising a further light source configured to emit an infrared light beam via said mirror assembly towards the eye;
wherein the light sensor is configured to record, as said return light, a reflection of the infrared light beam;
wherein the further light source is configured to emit the infrared light beam as a collimated infrared light beam;
wherein the mirror assembly is configured to deflect the collimated infrared light beam as a deflected collimated infrared light beam; and wherein the optical guide is a waveguide which has
- an in-coupling section configured to couple the deflected collimated infrared light beam into the waveguide,
- a guiding section configured to guide the deflected collimated infrared light beam through the waveguide, and
- an out-coupling section configured to couple the deflected collimated infrared light beam out from the waveguide as a collimated expanded infrared light beam whose cross section is larger than the cross section of the deflected collimated infrared light beam.

16. The display device according to claim 1, wherein the processor is connected to the light source and configured to control the light source in dependence on the detected state of the eye.

\* \* \* \* \*